United States Patent [19]
Morimoto

[11] Patent Number: 6,005,676
[45] Date of Patent: Dec. 21, 1999

[54] COMMUNICATION CONTROL APPARATUS AND A METHOD THEREOF

[75] Inventor: Masaharu Morimoto, Suita, Japan

[73] Assignee: Megasoft, Inc., Osaka, Japan

[21] Appl. No.: 08/676,316

[22] PCT Filed: Nov. 11, 1994

[86] PCT No.: PCT/JP94/01921

§ 371 Date: Sep. 30, 1996

§ 102(e) Date: Sep. 30, 1996

[87] PCT Pub. No.: WO96/15618

PCT Pub. Date: May 23, 1996

[51] Int. Cl.[6] .................................................. H04N 1/32
[52] U.S. Cl. ........................................... 358/442; 358/468
[58] Field of Search ..................................... 358/442, 434,
358/436, 405, 400, 402, 403, 468; 379/100.01,
100.09, 100.16, 100.08, 93.05, 93.09, 377,
902; 375/222, 219, 220, 221

[56] References Cited

U.S. PATENT DOCUMENTS

| | | |
|---|---|---|
| 5,369,687 | 11/1994 | Farkas ........................................ 379/98 |
| 5,448,378 | 9/1995 | Matsumoto ............................... 358/468 |
| 5,524,047 | 6/1996 | Brown et al. .............................. 379/93 |
| 5,528,385 | 6/1996 | Manning .................................. 358/468 |
| 5,724,154 | 3/1998 | Ito et al. ................................... 358/400 |
| 5,751,442 | 5/1998 | Hamada et al. ......................... 358/442 |

*Primary Examiner*—Madeleine Nguyen
*Attorney, Agent, or Firm*—Merchant & Gould, P.C.

[57] ABSTRACT

Data communications between a FAX modem (36) and a facsimile (38) can be performed without using a telephone line. Electric characteristics of a line (44) are interrupted in view of direct current, and is connected in view of alternating current by a capacitor (C1). When an off-hook detection circuit (62) detects an off-hook state of the FAX modem (36), and the off-hook detection circuit (62) puts the direct current converter 60 in operation, a telephone line emulation voltage is applied to the line (44). A ringback signal is outputted to the line (44) by a ringback signal output circuit (66) as a result of a judgement of the ringback signal output circuit that it is a transmission from the FAX modem when an answering tone is not detected for predetermined duration. Data communication between the FAX modem (36) and the facsimile (38) can then be performed by calling the facsimile machine (38).

14 Claims, 14 Drawing Sheets

FLOW CHART OF COMMUNICATION CONTROL CIRCUIT 50

FLOW CHART OF DATA TRANSMISSION WHEN CARD TYPE FAX MODEM 36 OUTPUTS DATA

FLOW CHART OF DATA TRANSMISSION
WHEN CARD TYPE FAX MODEM 36 RECEIVES DATA

IN CASE OF DATA BEING TRANSMITTED FORM CARD TYPE FAX MODEM 36

IN CASE OF DATA RECEIVED BY
CARD TYPE FAX MODEM 36

COMMUNICATION CONTROL APPARATUS AND A METHOD THEREOF

FIELD OF THE INVENTION

The present invention relates to a communication control apparatus and a method for controlling communication between a modem etc. having a function of facsimile machine and a facsimile machine etc., especially communication control which is capable of communicating therebetween without using a telephone line.

BACKGROUND OF THE PRIOR ART

Recently, a modem having the function of a facsimile machine (hereinafter referred to as a FAX modem) has become popular. The FAX modem is an apparatus for converting documents, drawings or the like prepared by a computer into image data, and then transmitting the image data to a facsimile machine through a telephone line. It is possible for the FAX modem to transmit the document and the drawings etc. prepared by the computer to the facsimile machine without performing printing by a printer. Because there are some errors in reading papers caused by mechanical parts of the facsimile machine when the papers printed by the printer are read by the facsimile machine, the FAX modem has the advantage of no such errors in reading, and is capable of performing data transmission with high accuracy.

There is a demand to use a facsimile machine as a printer when the FAX modem is located near a facsimile machine. In that case, it is feasible to use the facsimile machine as a printer when the image data is transmitted to the facsimile machine by the FAX modem through the telephone line. However, since the data transmission performed therebetween requires the use of the telephone line, it requires various operations in addition to phone charges.

To resolve the problems described above, the applicant has already filed one patent application to the Japanese Patent Office entitled "Network Control Unit" (application number Hei 1-38949 and laid-open publication number Hei 2-218259). The inventions disclosed in the application have come to actual products named "STARFAX" and the products are on the market.

FIG. 1 shows a FAX modem 2 disclosed in laid-open publication number Hei 2-218259. In the FAX modem 2, both a switch 12 and a switch 14 are switched to a contact 12a and a contact 14a respectively, together with switching of a switch 16 and a switch 18, so as to contact 16b and to contact 18b, by controlling a relay 6 utilizing a computer 4. By carrying out these switchings, a facsimile modem circuit 24 (hereinafter referred to as FAX modem circuit) is coupled to a telephone line 22, so that data transmission through the telephone line 22 can be performed.

Also, the switch 12 and the switch 14 are switched to the contact 12a and the contact 14a together with switching of the switch 16 and the switch 18 so as to contact 16b and to contact 18b by controlling the relay 6 utilizing the computer 4. Thus, the facsimile machine 20 and the FAX modem circuit 24 are connected in series so that a voltage equivalent to a line voltage (48V) is supplied to the telephone line 22. Therefore, both the facsimile 20 and the FAX modem circuit 24 are in the same electrical state in that both are connected through the telephone line 22.

In case of performing data transmission from the FAX modem circuit 24 to the facsimile machine 20, ringback signals which are supposed to be generated by a switchboard are outputted from the FAX modem circuit 24. Upon receiving the ringback signals, the facsimile machine 20 sends back an answering tone corresponding to the ringback signals. Thereafter, procedures for data transmission in accordance with the ITU-T recommendation can be performed between the FAX modem circuit 24 and the facsimile machine 20. In addition, the answering tone is outputted from the FAX modem circuit 24 when data transmission from the FAX modem circuit 24 to the facsimile machine 20 is performed. Then, the procedures for data transmission in accordance with the ITU-T recommendation can be performed between the FAX modem circuit 24 and the facsimile machine 20.

Thus, direct data transmission between the FAX modem circuit 24 and the facsimile machine 20 can be performed without utilizing the telephone line 22. Thus, the invention laid opened in the laid-open publication number Hei 2-218259 has a great value.

DISCLOSURE OF INVENTION

The direct data transmission described above cannot be performed in a FAX modem which does not employ the technique shown in FIG. 1 and, there is a great demand to perform direct data transmission in every such FAX modem.

Since a circuit which generates the ringback signal must be installed in the FAX modem circuit 24 in the prior art described in FIG. 1, the circuit inhibits miniaturization of the FAX modem 2. Sometimes, the function of direct data transmission described as above cannot be installed in the FAX modem circuit 24, especially when the FAX modem circuit 24 is mounted in a card for PCMCIA standard slot(s), because of size limitations.

It is an object of the present invention to provide a communication control apparatus and a method thereof which realize direct data transmission by connecting a modem which does not have the function of direct data transmission, as well as to resolve the problems stated above.

Another object of the present invention is to provide a communication control apparatus and a method thereof which realize miniaturization of the FAX modem when performing direct data transmission.

In accordance with characteristics of the present invention, a communication control apparatus comprises:

a first line, one end of which being connected to a first terminal for line connection of a modem and other end of which being connected to a first line connection terminal of a facsimile machine, a second line, one end of which being connected to a second terminal for line connection of a modem and other end of which being connected to a second line connection terminal of a facsimile machine, direct current interrupt means connected to the first line or the second line, and direct current components being interrupted along with passing alternating current component, voltage apply means for applying telephone line emulation voltage on the first line or the second line positioned between the direct current interrupt means and the modem, and ground means for grounding the first line and the second line positioned between the direct current interrupt means and the facsimile machine.

In the present invention, the line is interrupted in view of direct current, and the telephone line emulation voltage and the ground are connected to both ends of the line. So that, it is emulated that both the modem and the facsimile machine are connected through the line electrically. Also, since transmitted signals between the modem and the facsimile machine are alternating signals, the signals pass through the direct current interrupt means. So that, data transmission between the modem and the facsimile machine is secured.

Also, in accordance with characteristics of the present invention, a communication control apparatus comprises:

a first line, one end of which being connected to a first terminal for line connection of one side of a modem and other end of which being connected to a first line connection terminal of other side of the modem, a second line, one end of which being connected to a second terminal for line connection of one side of a modem and other end of which being connected to a second line connection terminal of other end of the modem, direct current interrupt means connected to the first line or the second line, and direct current components being interrupted along with passing alternating current component, voltage apply means for applying telephone line emulation voltage on the first line or the second line positioned between the direct current interrupt means and the modem, ground means for grounding the first line and the second line positioned between the direct current interrupt means and other side of the modem, off-hook detection means for detecting an off-hook state of one side of the modem by detecting voltage of the first line or the second line, answering tone detection means for detecting whether an answering tone being outputted or not by monitoring either of the first line or the second line, and ringback signal output means for outputting a ringback signal on the first line or the second line an when answering tone is not being detected by the answering tone detection means until predetermined duration being passed from detection of an off-hook state by the off-hook detection means.

Further, in accordance with characteristics of the present invention, a method for controlling communication control comprises steps of:

step for connecting a terminal for line connection of a modem and a line connection terminal of the modem with a line, step for providing direct current interrupt means which interrupt direct current components along with passing alternating current component, step for applying telephone line emulation voltage which emulates power supply voltage of a telecommunications exchanger between the direct current interrupt means and the modem, and step for outputting a ringback signal to the line when an answering tone is not being detected until passing predetermined duration from detection of an off-hook state.

In the present invention, a judgement is made whether it is a transmission from the one side of the modem or not by detecting answering tone or not within the predetermined duration from detection of an off-hook state. A ringback signal is outputted when it is judged as that the transmission is performed by the one side of the modem. So that, it is possible to perform communication without using the telephone line even when the modem does not have a function of outputting the ringback signals. Also, miniaturization of the modem can be realized, because it is not necessary to install the function of outputting the ringback signals.

While the novel features of the invention are set forth in a general fashion, both as to organization and content, it will be better understood and appreciated, along with other objects and features thereof, from the following detailed description taken in conjunction with the drawings.

BEST MODE FOR CARRYING OUT THE INVENTION

Figure 1:
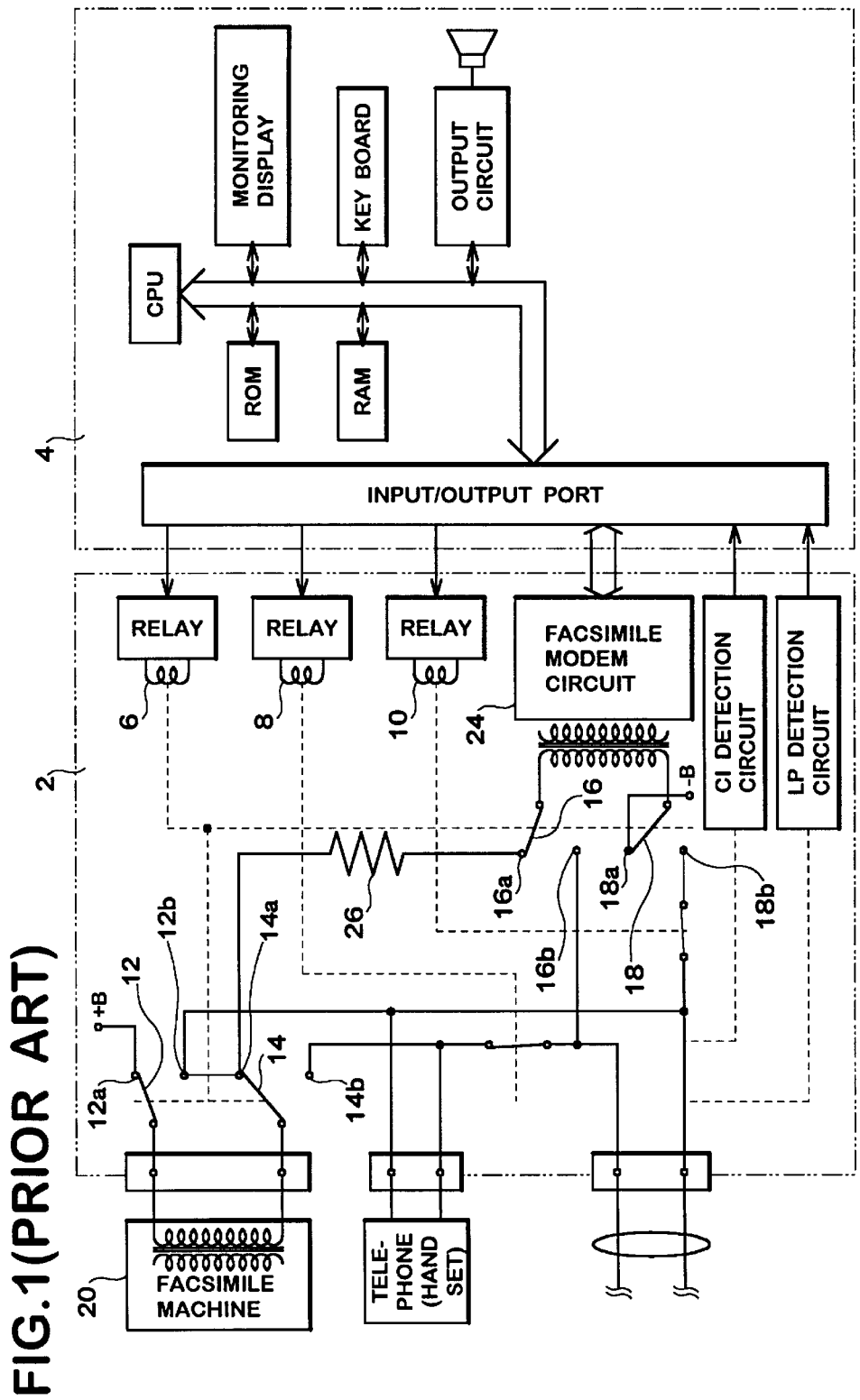
FIG. 1 is a block diagram of a communication control apparatus in the prior art.
Figure 2:
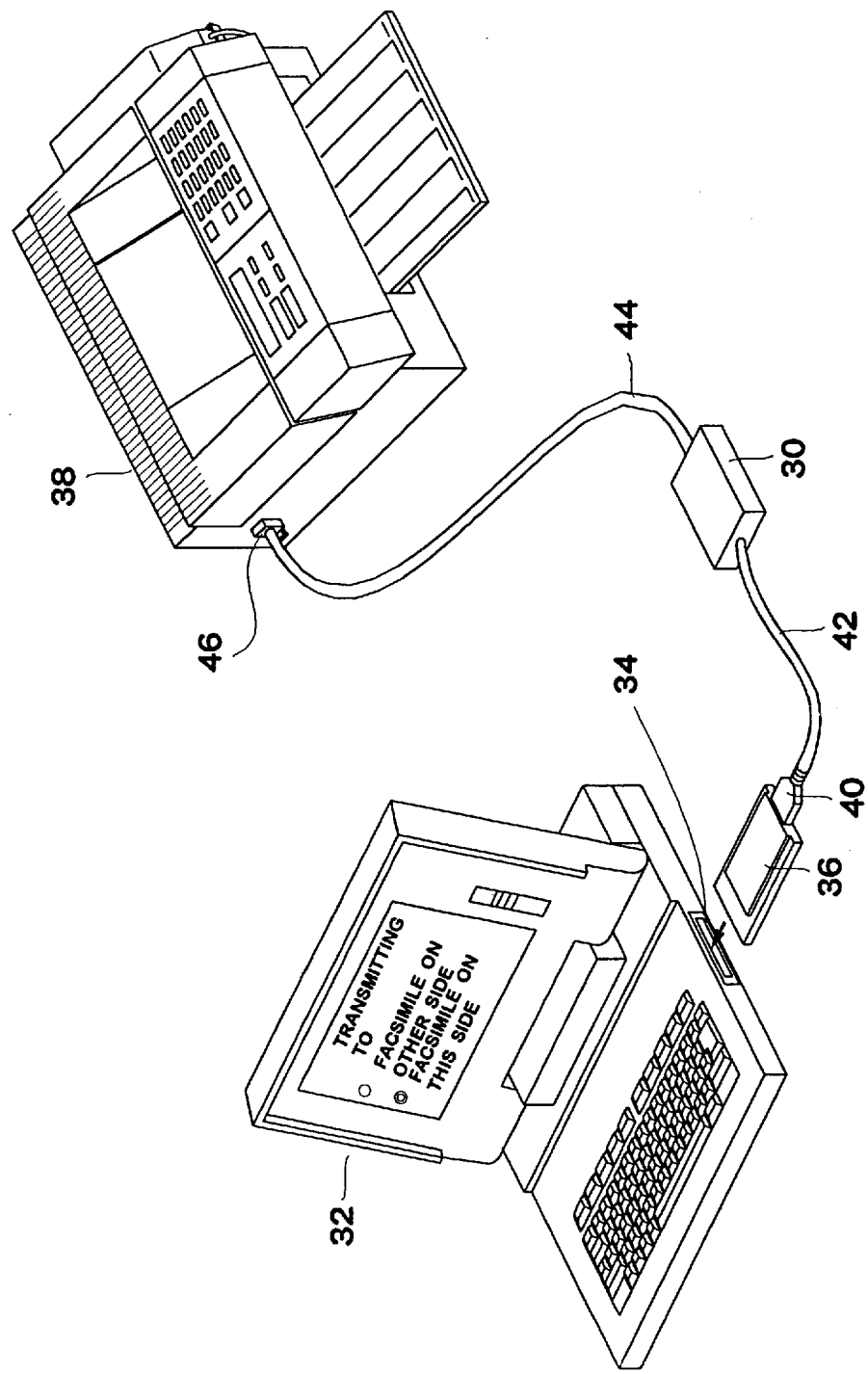
FIG. 2 is a perspective view illustrating connection of an adaptor 30 using a communication control apparatus in the present invention.

FIG. 2 shows a perspective view illustrating connection of an adaptor 30 using a communication control apparatus in accordance with the present invention. A slot 34 for PCM-CIA standard (type-II) is installed in the notebook computer 32. A card type FAX modem 36 acting as a modem is inserted into the slot 34. A total of seven pin type terminals are provided in rear end of the card type FAX modem 36. The terminals are connected to a connector 40. A cable 42 connects between the connector 40 and the adaptor 30. A cable 44 is extended from the other side of the adaptor, and a modular jack 46 is provided to the forward end of the cable 44. Also, the modular jack 46 is connected with a facsimile machine 38.

A software for controlling the facsimile machine ("STARFAX for Windows" of MEGA SOFT Inc. is used in this embodiment) is started on the computer 32 under the connection shown in FIG. 2. Next, a mode for performing data transmission without utilizing a telephone line which is displayed on a display screen of the computer as "the facsimile on this side" is selected, after selecting the data intended to transmit. By doing that, the data can be transmitted to the facsimile machine 38 and is outputted therefrom. In other words, the facsimile machine 38 can also be used as a printer.

Additionally, another mode for receiving data without utilizing the telephone line can be selected. By selecting this mode, the data which is printed on papers set on the facsimile machine 38 can be read by the computer 32. In other words, the facsimile machine 38 can be used as a scanner.

In regular use, the telephone line is connected to the terminals at the rear end of the card type FAX modem 36 through the connector (not shown).

Figure 3:
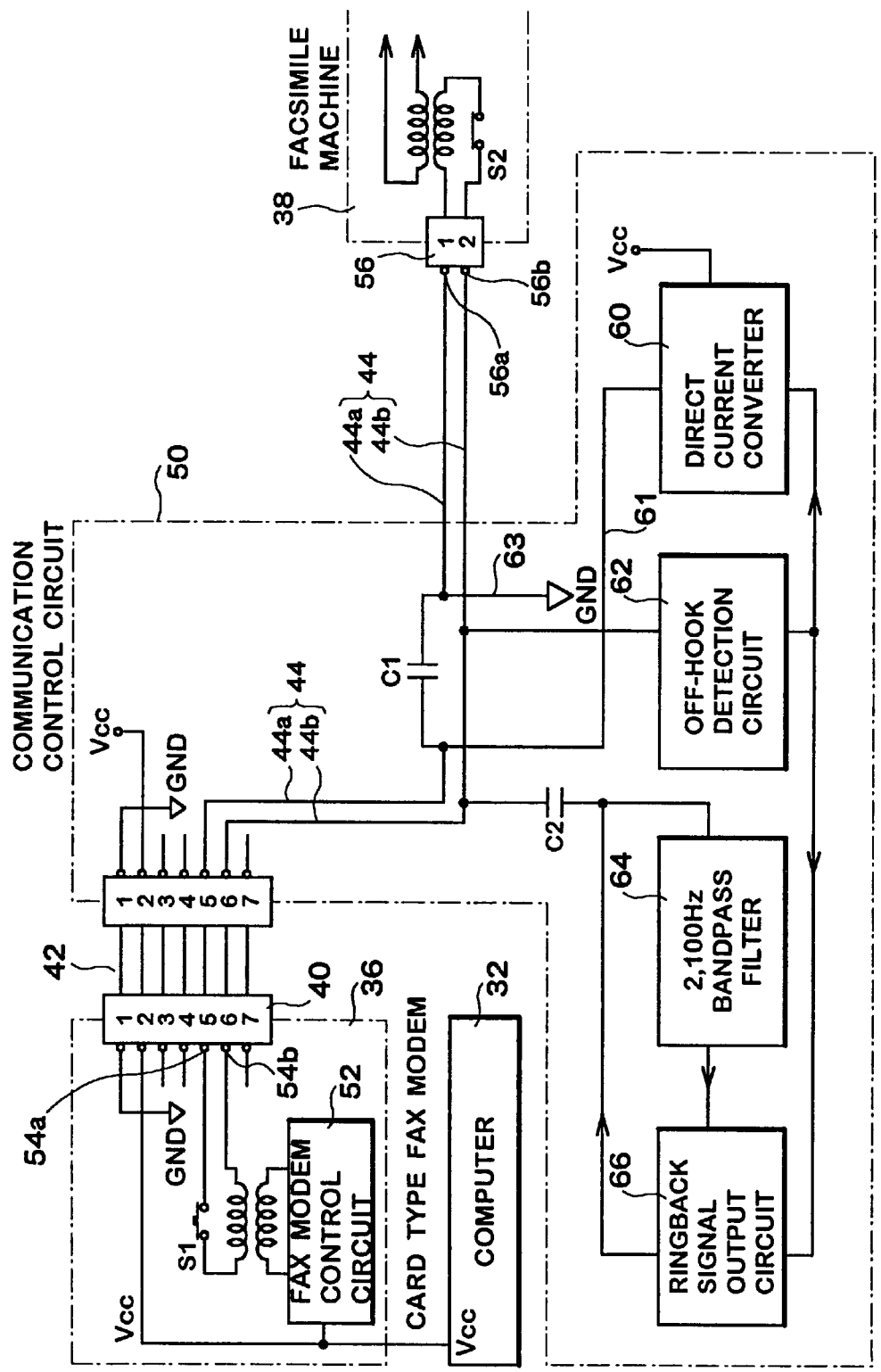
FIG. 3 is a block diagram of the communication control circuit 50 in the present invention.

FIG. 3 shows a block diagram corresponding to FIG. 2. As shown in FIG. 3, the card type FAX modem 36 comprises a FAX modem control circuit 52. A power source (5V) and the ground are obtained from the computer 32 through the card slot 34. A switch S1 is an off-hook switch which opens under an off-hook state.

A communication control circuit 50 is installed in the adaptor 30. A power source (5V) and the ground are obtained from the computer 32 through the cable 42, the connector 40 and the card type FAX modem 36. It is possible to prepare another power source only for the communication control circuit 50 separately from the power source. A first line 44a of the communication control circuit 50 is connected to a first terminal 54a for line connection of the card type FAX modem 36 by the cable 42. A capacitor C1 (10 µF) which acts as direct current interrupt means is connected through the first line 44a. The other side of the first line 44a is connected to a first terminal 56a for line connection of the facsimile machine 38.

Further, a second line 44b is connected to a second terminal 54b for line connection of the facsimile machine 38 by the cable 42. The other side of the second line 44b is connected to a first terminal 56b for line connection of the facsimile machine 38. A switch S2 is an off-hook switch which opens under an off-hook state. Detail structure of the facsimile machine is omitted for simplification.

In the communication control circuit 50, one side located toward the facsimile machine 38 of the capacitor C1 is grounded, and the other side positioned toward the card type FAX modem 36 of the capacitor C1 is connected to a direct current converter 60 which acts as a voltage apply means. An off-hook detection circuit 62 for detecting an off-hook state of the card type FAX modem 36 is connected to the second line 44b. Further, a bandpass filter 64 which acts as an answering tone detection means and a ringback signal output circuit 66 which acts as a ringback signal output means are connected through the second line 44b.

Figure 7:
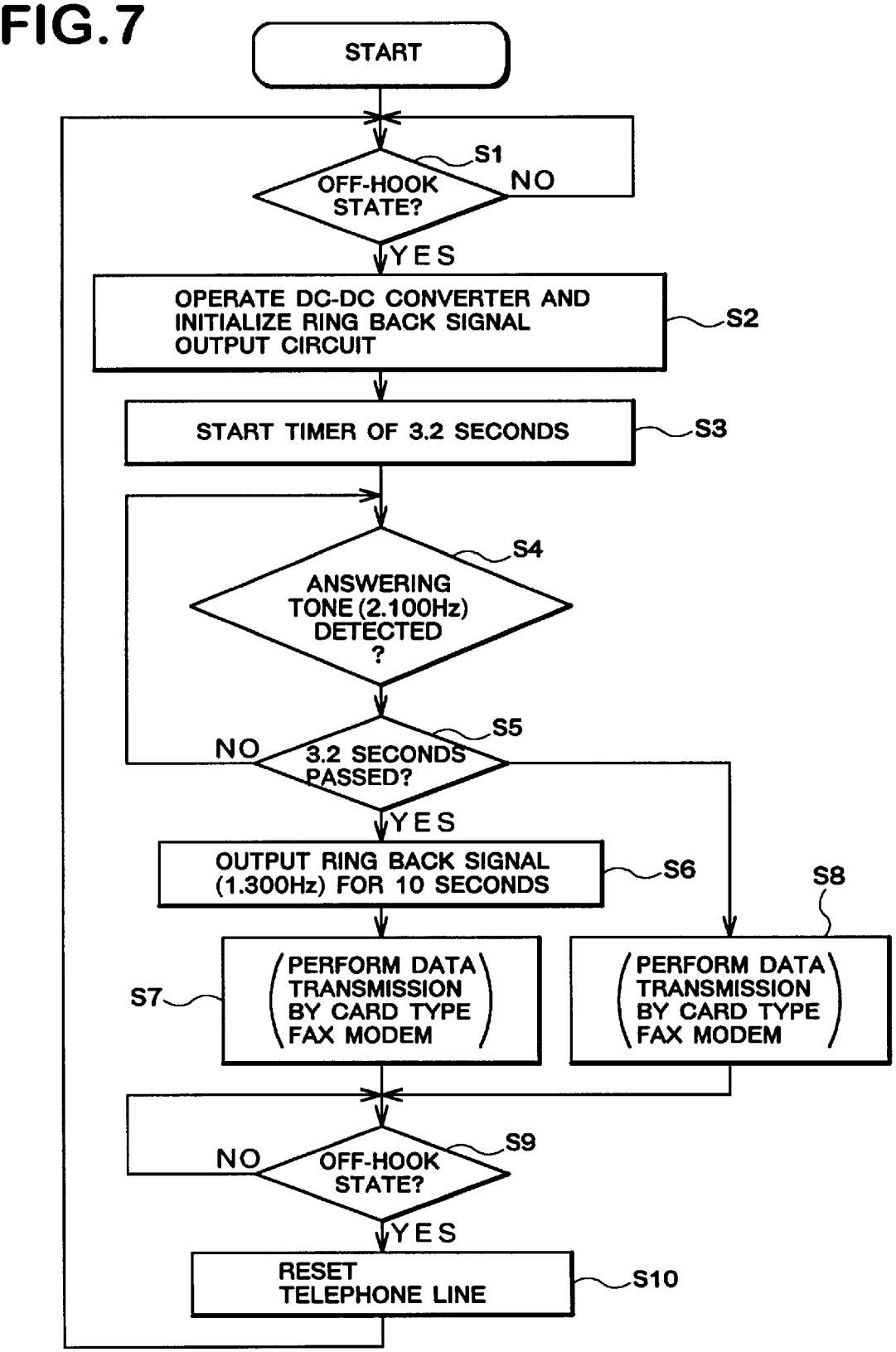
FIG. 7 is a flow chart illustrating operations of the communication control circuit 50.
Figure 8:
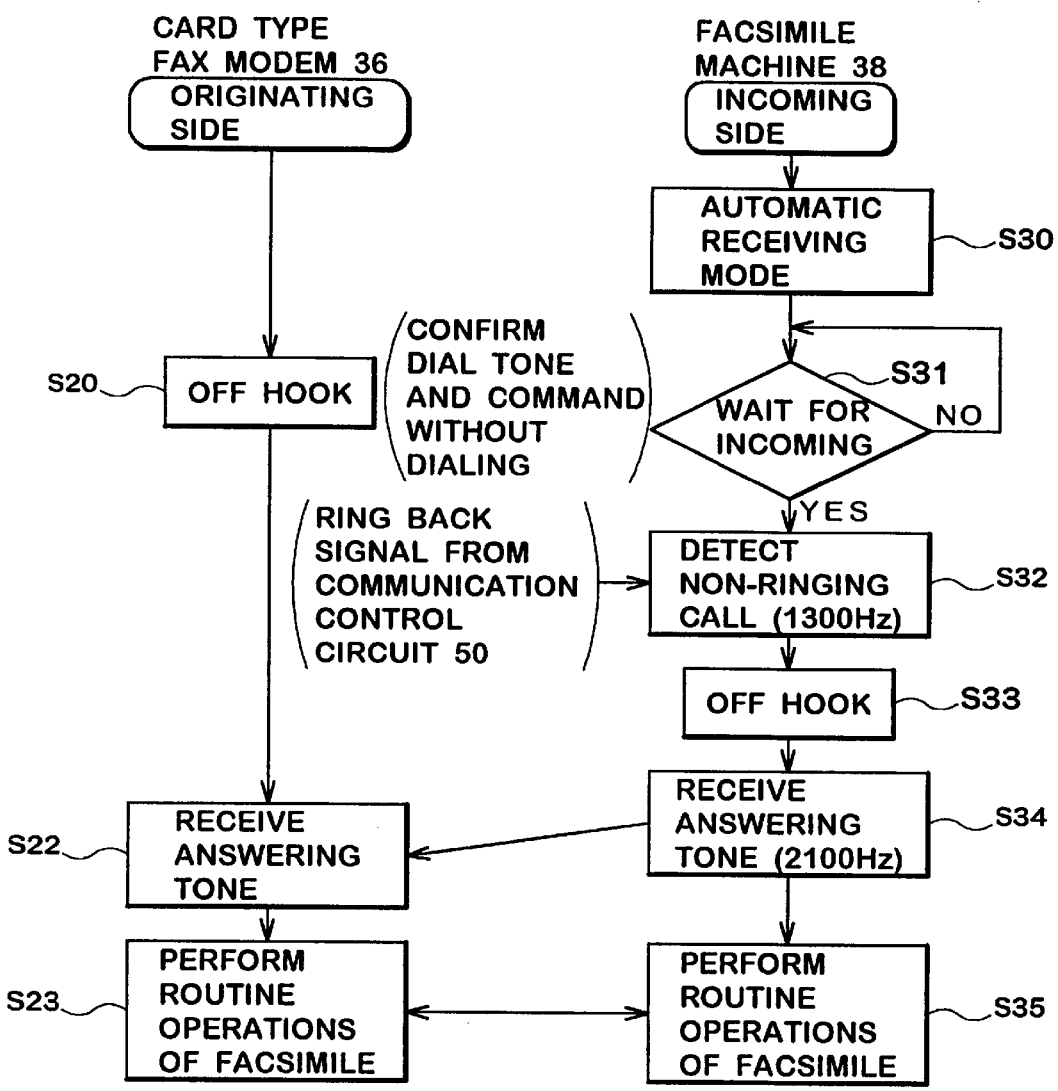
FIG. 8 is a flow chart illustrating operations when data is transmitted from the card type FAX modem 36.

Next, operations for transmitting data from the card type FAX modem 36 to the facsimile machine 38 by utilizing the communication control apparatus 50 is described with reference to FIG. 3. FIG. 7 shows a flow chart illustrating operations of the communication control apparatus 50. FIG. 8 shows a flow chart illustrating operations of the card type FAX modem 36 (the computer 32) and the facsimile machine 38.

At first, an operator inputs a command of a mode for performing data transmission without utilizing the telephone line to the computer 32 (see a display on the display screen in FIG. 2). Upon receiving the command, the computer 32 outputs a Hayes compatible AT command set "ATX 3" which represents it does not confirm dial tones to the card type FAX modem 36. Successively, the computer 32 outputs another Hayes compatible AT command set "ATD" to the card type FAX modem 36 without inputting dial numbers, the command represents it enters to a transmission mode without dialing. These commands are outputted to reduce dialing, because the data transmission described in above are not performed through the telephone line.

On receipt of the Hayes compatible AT command set "ATD", the FAX modem control circuit 52 of the card type FAX modem 36 enters into transmission mode without dialing after closing the switch S1 (when the card type FAX modem 36 is in the off-hook state) (FIG. 8, step S20). A condition wherein the switch S1 is closed, in other words the off-hook state of the card type FAX modem 36, is detected by the off-hook detection circuit 62 of the communication control apparatus 50 (FIG. 7, step S1). The off-hook state is detected as discussed hereafter. Source voltage (5V) is applied to the card type FAX modem 36 side of the first line 44a through the direct current converter 60. Certain voltage is detected at the second line 44b when the card type FAX modem 36 is in the off-hook state by closing the switch S1. Either an off-hook state or an on-hook state is judged by detecting the voltage at the second line 44b. An off-hook state is not detected when the facsimile machine 38 is in the off-hook state (when the switch S2 is closed), since the facsimile machine 38 side of the first line 44a is grounded. In other words, it is possible for the off-hook detection circuit 62 to detect only the off-hook state of the card type FAX modem 36.

The direct current converter 60 is operated after detecting an off-hook state by the off-hook detection circuit 62 (FIG. 7, step S2). As a result, a line emulation voltage (24V) is applied. By applying the emulation voltage, it is emulated that both of the card type FAX modem 36 and the facsimile machine 38 are connected to the line electrically. Thus, it is possible to save consumption of electric power so as to apply the line emulation voltage after detecting the off-hook state. Although the line emulation voltage is applied under 24V in this embodiment, 48V equal to the line voltage can be applied as the line emulation voltage. The line emulation voltage can be varied to larger voltage or smaller voltage unless the communication control apparatus is operational.

The off-hook detection circuit 62 makes the direct current converter 60 operational and utilizes the ringback signal output circuit 66 (FIG. 7, step S2). By doing that, the ringback signal output circuit 66 starts its operation by resetting the timer (FIG. 7, step S3).

The bandpass filter 64 detects whether the answering tone (2,100 HZ) is outputted on the second line or not (FIG. 7, steps S4). When the answering tone is not detected for 3.2 seconds by the timer, it is judged that the signals outputted on the second line are transmission mode signals from the card type FAX modem 36 (FIG. 7, step S5). The ringback signal output circuit 66 makes the judgement described in step S5 in accordance with the detection result of the bandpass filter and the timer. Ringback signals (1,300 HZ) are outputted to the second line when the ringback signals output circuit 66 judges that the signals are transmission mode signals (FIG. 7, step S6). Although non-ringing call signals (1,300 HZ) are outputted in this embodiment, it may output ringing call signals (16 HZ) by the ringback signal output circuit 66.

The facsimile machine 38 which is waiting for a call detects the non-ringing call signals (FIG. 8, step S32). On detecting the non-ringing call signals, the facsimile machine 38 is turned into the off-hook state by closing the switch S2 (FIG. 8, step S33). Thereafter, an answering tone (2,100 HZ) is transmitted to the card type FAX modem 36 through the first line 44a and the second line 44b (FIG. 8, step S34). During the transmission, though the first line 44a is interrupted in view of direct current by the capacitor (the direct current interrupt means) C1 when direct current is applied thereto, the first line 44a is not interrupted when alternating current is applied thereto. The answering tone is received by the card type FAX modem 36. From that point of view, it is preferable to have less impedance with respect to alternating current. A capacitor having impedance of 10 µF is used in this embodiment.

Then the card type FAX modem 36 which receives the answering tone (FIG. 8, step S22) performs routine operations for data transmission which follow output of CNG signals etc. (FIG. 8, step S23). In other words, phases A, B, C, D, and E (after output of CNG signals) stated in the ITU-T recommendation are performed.

Alternatively, the facsimile machine 38 performs routine operations for data receiving which follow output of CED signals etc. (FIG. 8, step S35). In other words, phases A, B, C, D, and E (after output of CNG signals) stated in the ITU-T recommendation are performed.

The communication control circuit 50 does not perform any operation during data transmission performed by the card type FAX modem 36 (FIG. 7, step S7). The FAX modem control circuit 52 is in the off-hook state by closing the switch S1 when transmission operations of the card type FAX modem 36 are finished. The off-hook state of the FAX modem control circuit 52 is detected with the off-hook detection circuit 62 of the communication control circuit 50 by detecting opening of the switch S1 (FIG. 7, step S9). On detecting an off-hook state of the FAX modem control circuit 52 with the off-hook detection circuit 62, the communication control circuit 50 controls to reset the ringback signal output circuit 66 by stopping operating the direct current converter 60 (FIG. 7, step S10). Thereafter, the operation goes back to step S1.

As described above, data transmission from the card type FAX modem 36 to the facsimile machine 38 can be performed by control of the communication control circuit 50 without utilizing the telephone line. That is, direct transmission without using the telephone line can be performed by utilizing the communication control circuit 50 when a FAX modem does not have the function of outputting the ringback signals.

Further to the above, operations for data transmission from the facsimile machine 38 to the card type FAX modem 36 by utilizing the communication control circuit 50 will be described with reference to FIG. 3. FIG. 7 shows a flow chart of operations of the communication control apparatus 50, and FIG. 9 is a flow chart illustrating operations of both the card type FAX modem 36 (the computer 32) and the facsimile machine 38.

At first, the operator inputs a command which shows that it is the command for a receiving mode without utilizing the telephone line to the computer 32. On receipt of the command, the computer 32 outputs a Hayes compatible AT command set "ATX 3" and "ATA" to the card type FAX modem 36 in order for the FAX modem 36 to assume the receiving mode (FIG. 9, step S40).

Figure 9:
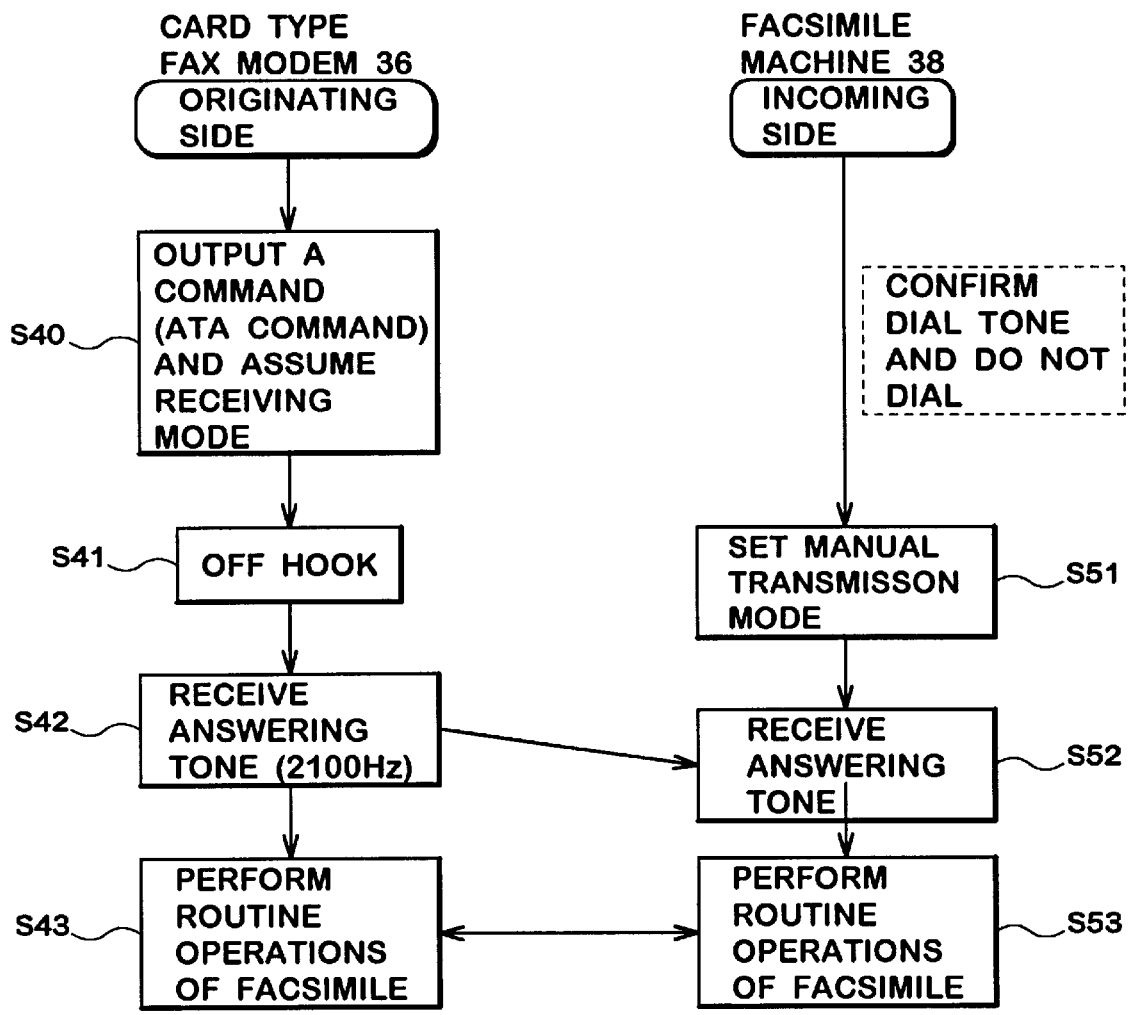
FIG. 9 is a flow chart illustrating operations when data transmission is received at the card type FAX modem 36.

Upon receipt of the Hayes compatible AT command set, the FAX modem control circuit 52 of the card type FAX modem 36 assumes the receiving mode by performing off-hook (close the switch S1) (FIG. 9, step S41). An answering tone (2,100 HZ) is outputted on the first line 44a and the second line 44b when 1.8 to 2.5 seconds pass after performing the off-hook operation (step S42).

The direct current converter 60 is operated when the off-hook state of the card type FAX modem 36 is detected by the off-hook detection circuit 62 of the communication control circuit 50. As a result, telephone line emulation voltage (24V) is applied to the first line 44a and the second line 44b. Both the card type FAX modem 36 and the facsimile machine 38 are in the same electrical condition when both of them are connected with the telephone line.

Also, the ringback signal output circuit 66 is operated by resetting a timer when the off-hook state is detected with the off-hook detection circuit (FIG. 7, step S2, S3). The off-hook detection circuit 62 judges whether the answering tone (2,100 HZ) is detected by the bandpass filter 64 within a duration that the timer counts (within 3.2 seconds from detection of the off-hook state) (FIG. 7, step S4, S5). As described above, the answering tone is outputted after 1.8 to 2.5 seconds from detection of the off-hook state. It can be judged that the card type FAX modem 36 is in the receiving mode when the timer detects the answering tone before it counts 3.2 seconds. Therefore, the ringback signals are not outputted from the communication control circuit 50 when an answering tone is detected at step S4.

In the facsimile machine 38 which performs data transmission, the operator turns the facsimile machine to the off-hook state manually after setting papers on the facsimile machine 38 (FIG. 9, step S51). An answering tone outputted from the card type FAX modem 36 is received by the facsimile machine 38 which is in the off-hook state (step S52). The operator pushes a starting button of the facsimile machine 38 when the operator confirms the answering tone. Thereafter, the facsimile machine 38 performs routine operations for data transmission (FIG. 9, step S53). In other words, phases B, C, D, and E stated in the ITU-T recommendation are performed.

The communication control circuit 50 does no perform any operations when data transmission is performed by the card type FAX modem 36 (FIG. 7, step S8). The FAX modem control circuit 52 is in the off-hook state by closing the switch S1 when receiving operations of the card type FAX modem 36 are finished. The off-hook state of the FAX modem control circuit 52 is detected with the off-hook detection circuit 62 of the communication control circuit 50 by detecting opening of the switch S1 (FIG. 7, step S9). On detecting the off-hook state of the FAX modem control circuit 52 with the off-hook detection circuit 62, the communication control circuit 50 controls to reset the ringback signal output circuit 66 by stopping operating the direct current converter 60 (FIG. 7, step S10). Thereafter, the operation goes back to step S1.

As described above, data transmission from the facsimile machine 38 to the card type FAX modem 36 can be performed by control of the communication control circuit 50 without using the communication line.

Figure 4:
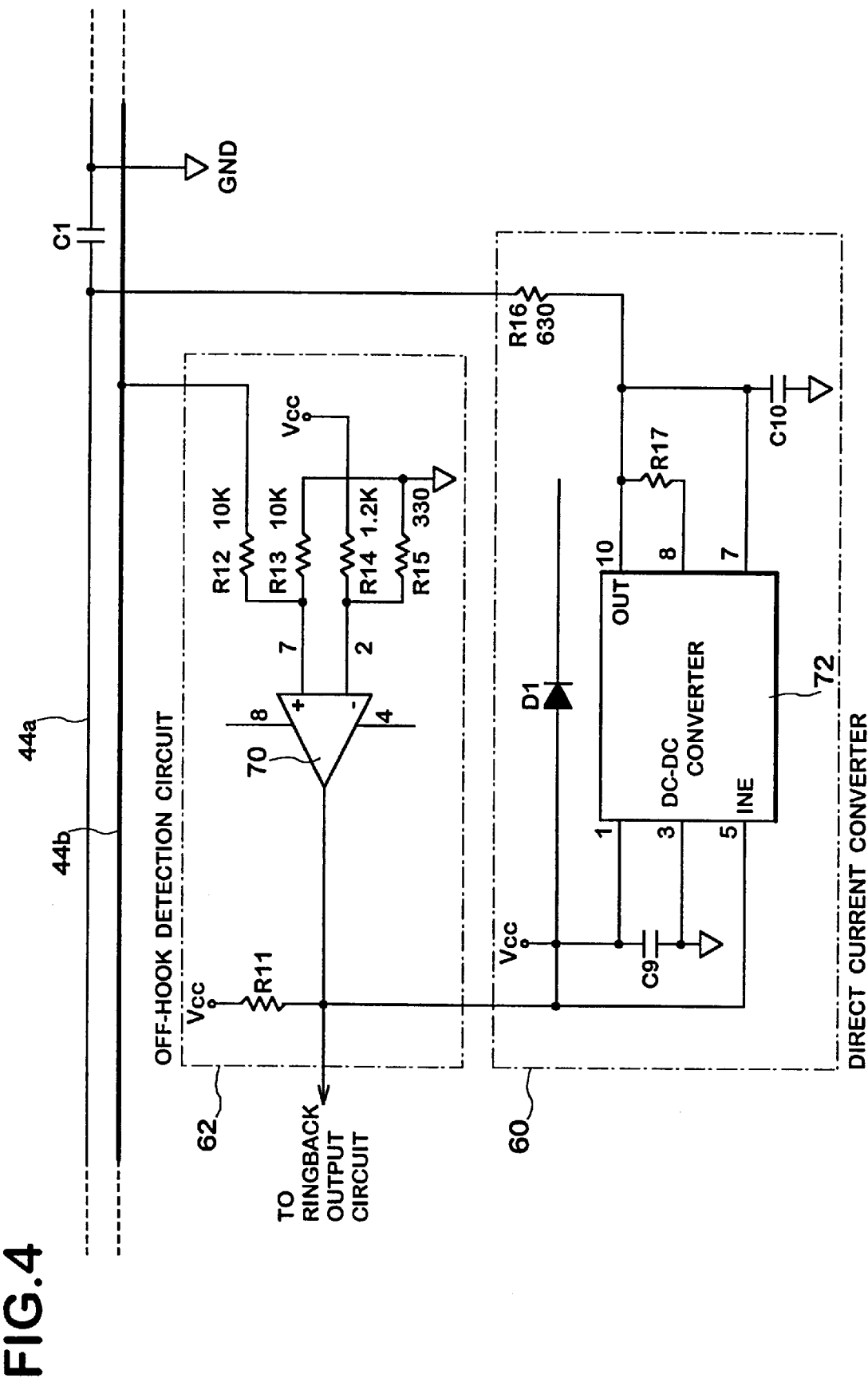
FIG. 4 is a detailed diagram of an off-hook detection circuit 62 and a direct current converter 60, both comprising the communication control circuit 50.
Figure 5:
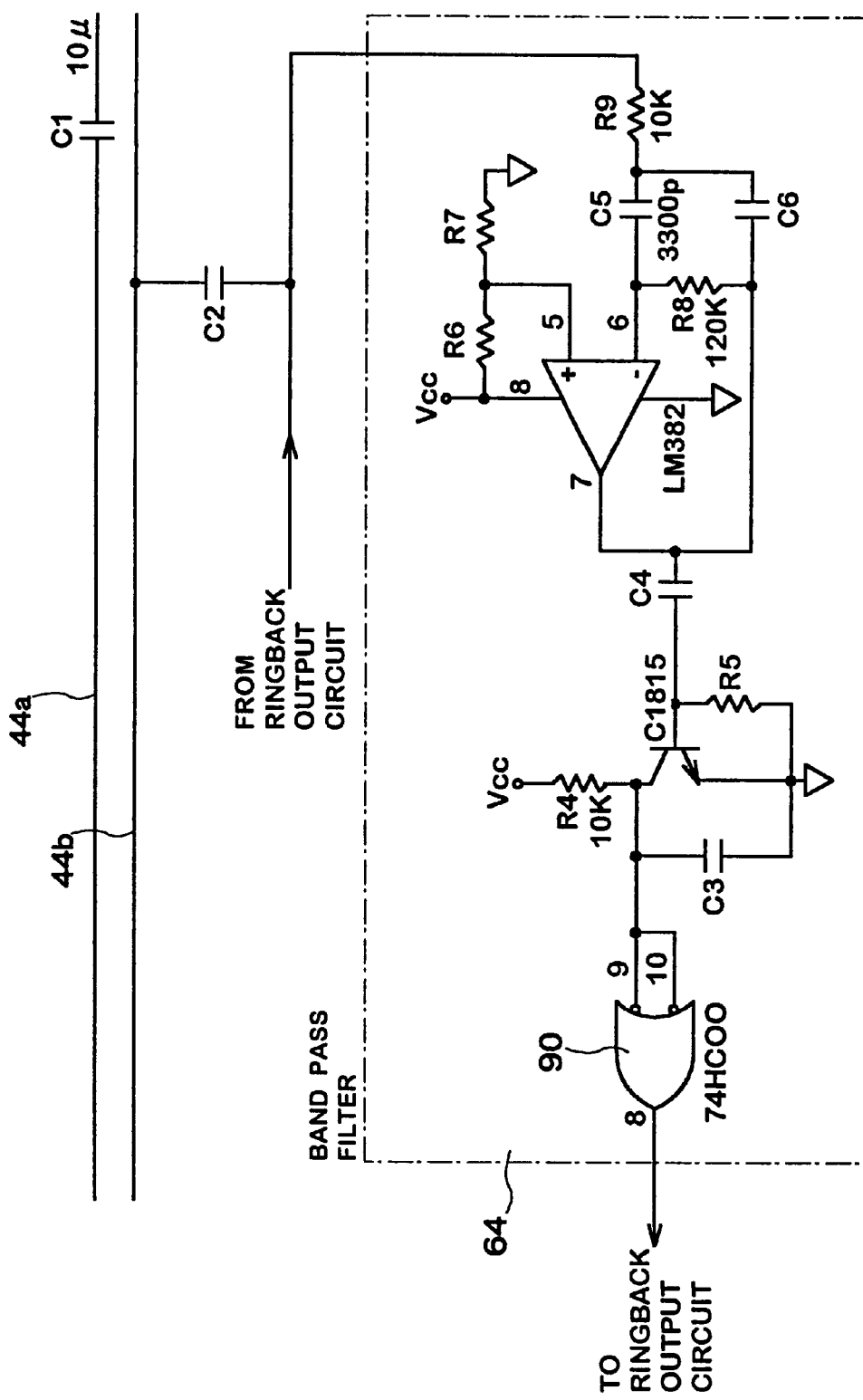
FIG. 5 is a detailed diagram of a bandpass filter 64 which comprises the communication control circuit 50.
Figure 6:
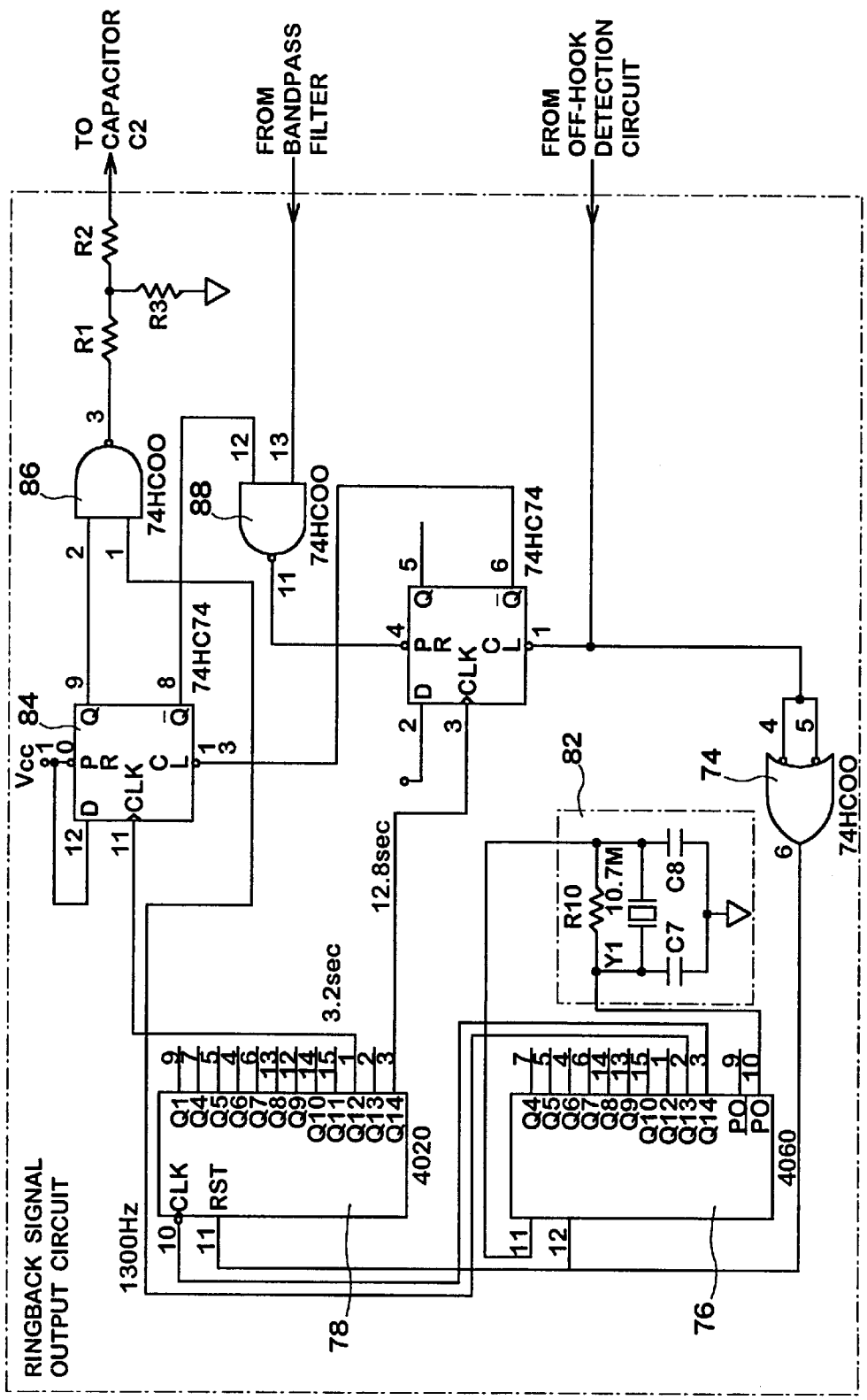
FIG. 6 is a detailed diagram of a ring back signal transmission circuit 66 which comprises the communication control circuit 50.

FIG. 4 shows a detailed diagram of the off-hook detection circuit 62 and the direct current converter 60. Also, FIG. 5 is a detail view of a bandpass filter 64. Further, FIG. 6 is a detailed diagram of the ringback signal transmission circuit 66. Operations for data transmission from the card type FAX modem 36 to the facsimile machine 38 will be described with reference to the diagrams and a timing chart shown in FIG. 10.

In FIG. 4, source voltage 5V is applied to a point A through a diode D1 when a DC-DC converter 72 of the direct current converter 60 is not operated. Then 5V (source voltage) is applied to the first line 44a through a resistor R16. Also, a comparator 70 is comprised in the off-hook detection circuit 62. The second line 44b is connected with the first line 44a when the card type FAX modem 36 is turned into the off-hook state. Output of the comparator 70 is changed from "L" to "H" (see α1 in FIG. 10) (corresponds to step S1 in FIG. 7). Thus, output of an enabling terminal INE of the DC-DC converter 72 of the direct current converter 60 is turned into "H" so that the DC-DC converter 72 is operated. Hence, 24V is outputted from the an output terminal OUT of the DC-DC converter 72. The voltage of 24V thus outputted is applied to the first line 44a through the resistor R16. Since the resistor R16 is comprised in the direct current converter 60, overload current can never be applied to a circuit even when the circuit is formed between the card type FAX modem 36 and the facsimile machine 38 caused by turning of both the card type FAX modem 36 and the facsimile machine 38 into an off-hook state. Alternatively, any other devices which limit the overload current can be used for the resistor R16.

Figure 10:
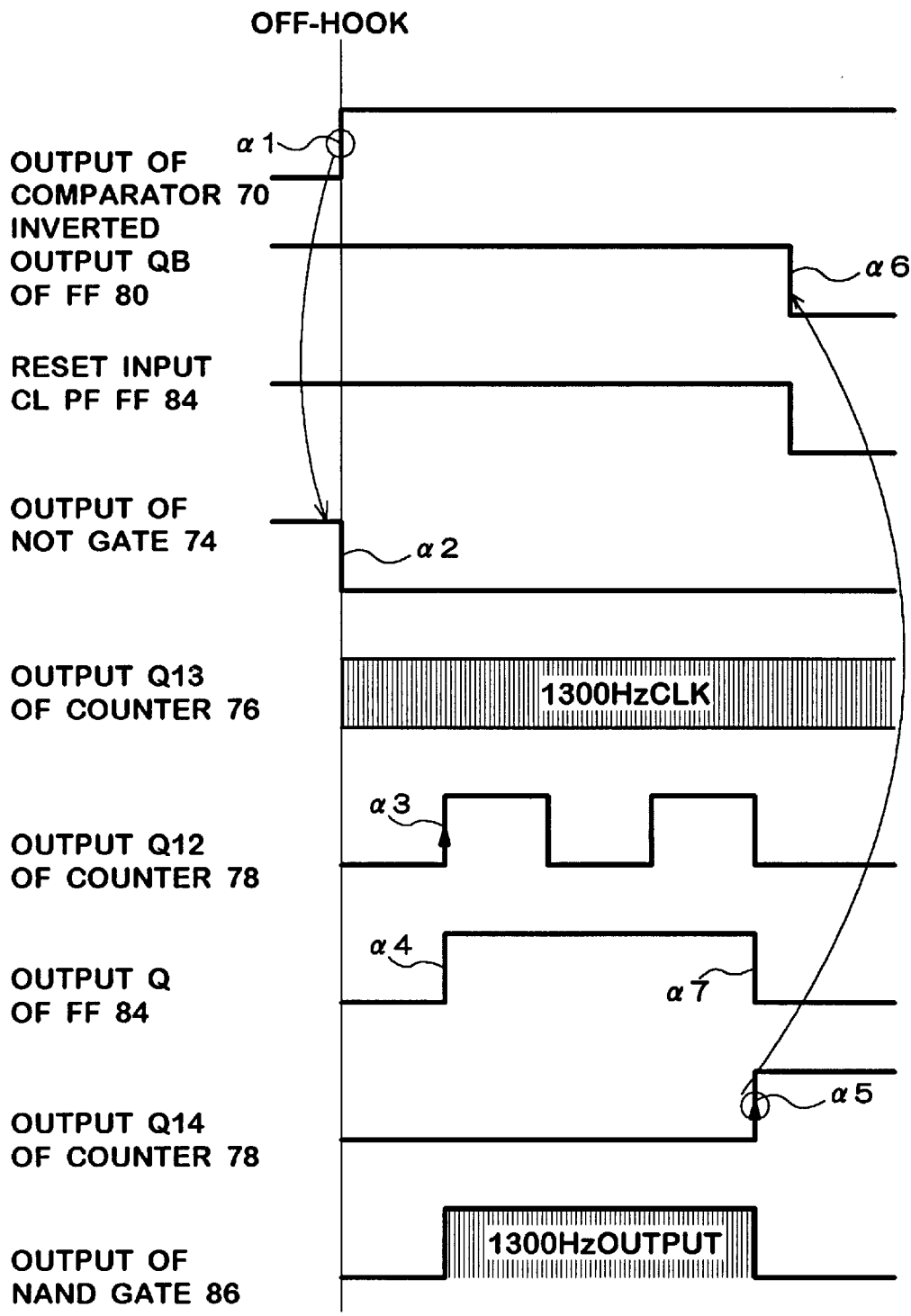
FIG. 10 is a timing chart illustrating output timings when data is transmitted from the card type FAX modem 36.

An output of NOT gate 74 is changed from "H" to "L" by the output of the comparator 70 which is turned into "H" by the off-hook state (see α2 in FIG. 10). As a result of that, both a counter 76 and a counter 78 comprising the timer are reset (corresponds to step S2 of FIG. 7). Also, a flip-flop circuit 80 (hereinafter referred to as FF) is reset by the output "H" of the comparator 70.

The timer starts counting after resetting as described above, because a clock circuit 82 is connected to an input P1 of the counter 76 (corresponds to step S3 of FIG. 7). An output from a counting output Q14 of the counter 76 is provided to a clock input CLK of the counter 78. An output which divides clock signals of the clock circuit 82 is outputted from a count output Q12 of the counter 78. In this embodiment, signals which start rising at 3.2 seconds after counting are obtained (see FIG. 10). The output of the count output Q12 of the counter 78 thus obtained is provided to a clock input of a FF 84. Hence, the output Q of the FF 84 is changed from "L" to "H" (see α4 in FIG. 10) (corresponds to step S5 of FIG. 7) by reset of the FF 84 which is triggered by the signal rise detected at 3.2 seconds after detection of an off-hook state. By doing that, a NAND gate 86 is opened. A signal of 1,300 Hz which is obtained by dividing the clock signal is provided to the NAND gate 86 (see output Q13 of the counter 76 in FIG. 10), such that the signal having a frequency of 1,300 Hz is supplied to a line through a capacitor C2 as ringback signals (see output of NAND 86 in FIG. 10) (corresponds to step S6 in FIG. 7).

Output Q14 of the counter 78 is changed to "H" when 12.8 seconds pass from the start (see α5 in FIG. 10). The FF 80 is set by that change, and inverted output QB of the FF 80 is changed to "L" (see α6 in FIG. 10). Further to this, the inverted output sets the FF 84, and the output Q of the FF 84 is changed to "L" (see α7 in FIG. 10). Hence, the ringback signal is outputted only approximately for 10 seconds.

Thereafter, output of the comparator 70 shown in FIG. 4 is changed from "H" to "L" when an off-hook state is detected by finishing data transmission performed with the card type FAX mode 36, such that the DC-DC converter 72 stops its operation (corresponds to step S9 and S10 in FIG. 7).

Detailed operations for data receiving at the card type FAX mode 36 will be described with reference to a timing chart shown in FIG. 11. For data receiving, output of the comparator 70 is also changed to "H" when an off-hook state is detected as shown in FIG. 10 (see β2 in FIG. 11). An answering tone (2,100 Hz) is outputted on the first line 44a and the second line 44b at 1.8 to 2.5 seconds after detecting the off-hook state when the card type FAX modem 36 performs data receiving. Output of a NOT gate 90 is changed from "L" to "H" by the bandpass filter 64 shown in FIG. 5 which detects the answering tone (see β2 in FIG. 11) (corresponds to step S4 in FIG. 7).

Figure 11:
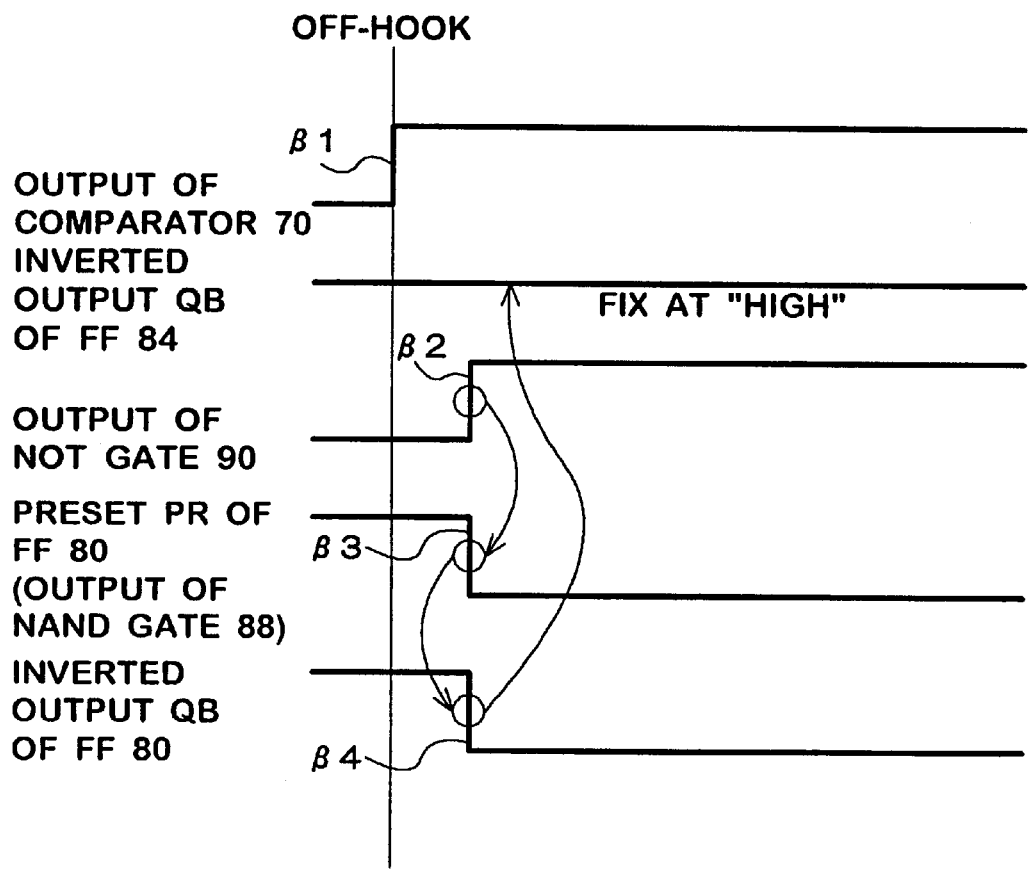
FIG. 11 is a timing chart illustrating output timings when data is received at the card type FAX modem 36.

Output of the NAND gate 88 is changed from "H" to "L" by the output of the NOT gate 90 provided to the NAND gate 88 (see β3 in FIG. 11). Also, the output of the NOT gate 90 is provided to a preset input PR of the FF 84, and inverted output QB is changed to "L" (see β4 in FIG. 11). The FF 84 maintains a reset state by the inverted output QB, and the output Q of the FF 84 maintains its condition as "L". Hence, the FF 84 is not set, and the ringback signal (1,300 Hz) does not pass through the NAND gate 86 even when "H" is outputted from the output Q12 of the counter 78 after 3.2 seconds pass from detecting an off-hook state.

As described above, a ringback signal is not outputted when the card type FAX modem 36 performs data receiving. Although a ringback signal is outputted when an answering tone is not detected after 3.2 seconds in the embodiment described above. Other durations can be used as long as it exceeds 2.5 seconds.

All the functions of the communication control apparatus 50 described above are performed by hardware logic, part or all the function of that can be performed by CPU instead of the hardware logic.

Although the direct current interrupt means (capacitor C1) is connected to the first line 44a in the embodiment described above and an embodiment to be described hereunder, the capacitor C1 can be connected to the second line 44b. Further, the capacitor C2 and the off-hook detection circuit 62 can be connected to the second line 44b.

Although a voltage of 5V is converted into the line emulation voltage (24V in the above embodiment) by utilizing the direct current converter 60, it is not necessary to provide the direct current converter when the line emulation voltage is supplied from either of the computer 32 or the FAX modem 36. It is also not necessary to provide the direct current converter when a power source which supplies the line emulation voltage is provided separately to the communication control apparatus 50. Power consumption can be saved when a power source which outputs lower voltage is provided and the lower voltage is converted by a direct current converter, even when a power source is provided separately.

Figure 12:
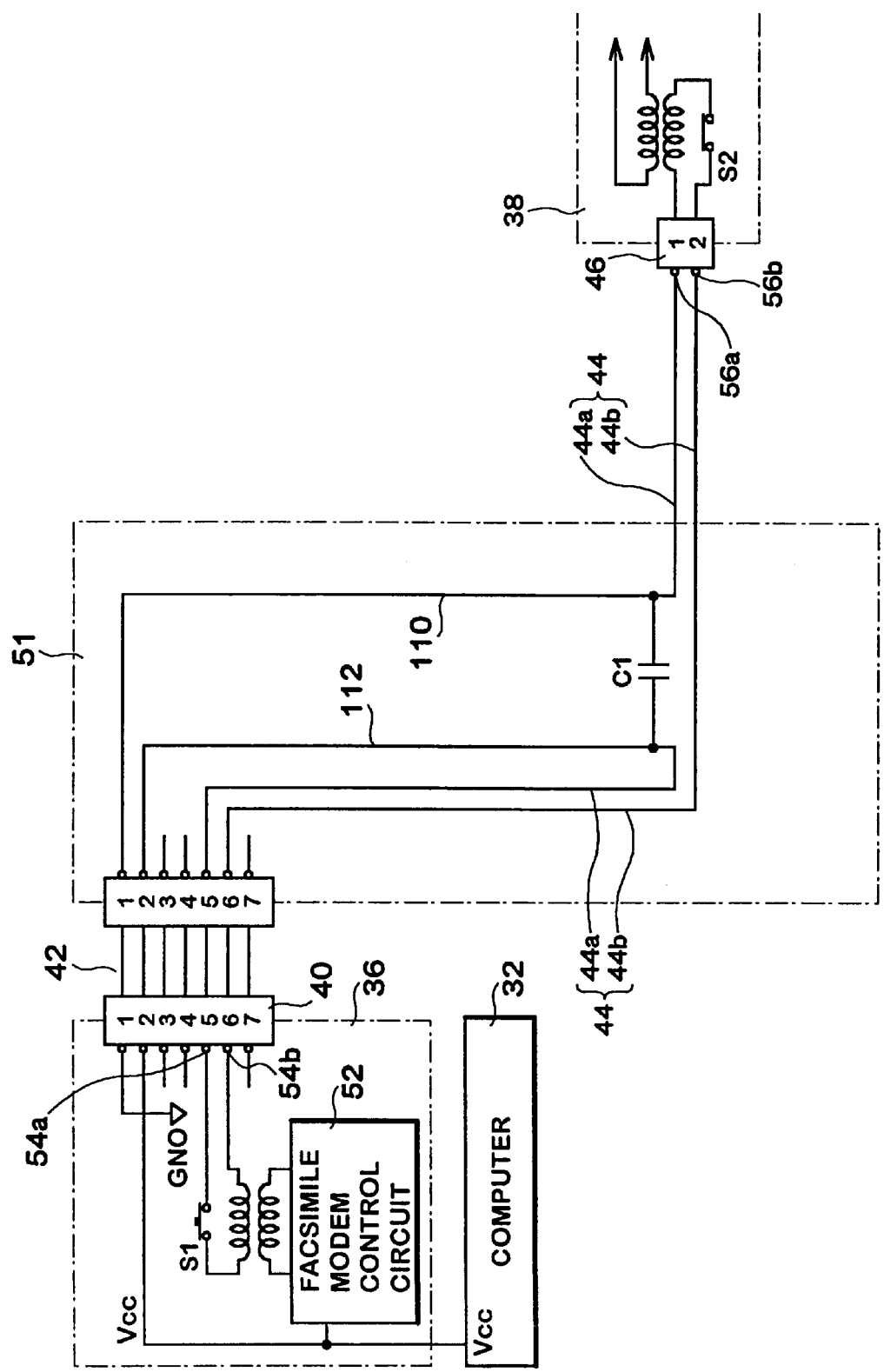
FIG. 12 is a block diagram of a communication control circuit 51 in another embodiment of the present invention.

FIG. 12 is a block diagram of a communication control circuit 51 in another embodiment of the present invention. In this embodiment, the FAX modem control circuit 52, having communication control circuit 51 which is used when the control circuit 52 has the function of outputting a ringback signal, is shown. Both the first line 44a and the second line 44b are provided in the communication control circuit 51. A capacitor C1 acting as a direct current interrupt is connected to the first line 44a. One end of the capacitor C1 located on the facsimile machine 38 side is grounded through the cable 42. The other end of the capacitor C1 located on the FAX modem 36 side is connected to a power source which generates line emulation voltage (24V) through the cable 42. Because the power source can be provided with the communication control circuit 51 separately, both the off-hook detection circuit 62 and the direct current converter 60 can be provided in the communication control circuit 51 as shown in FIG. 3. FIG. 12 shows a block diagram of circuits when a resistor R16 shown in FIG. 4 is provided in the FAX modem 36. The resistor R16 can be provided to either a power supply line 112 or a line 110 when the resistor R16 is not provided in the FAX modem 36.

Although the voltage apply means is comprised by the direct current converter 60 in the embodiment shown in FIG. 3, the voltage apply means is comprised by the power source line 112 in the embodiment shown in FIG. 12.

Figure 13:
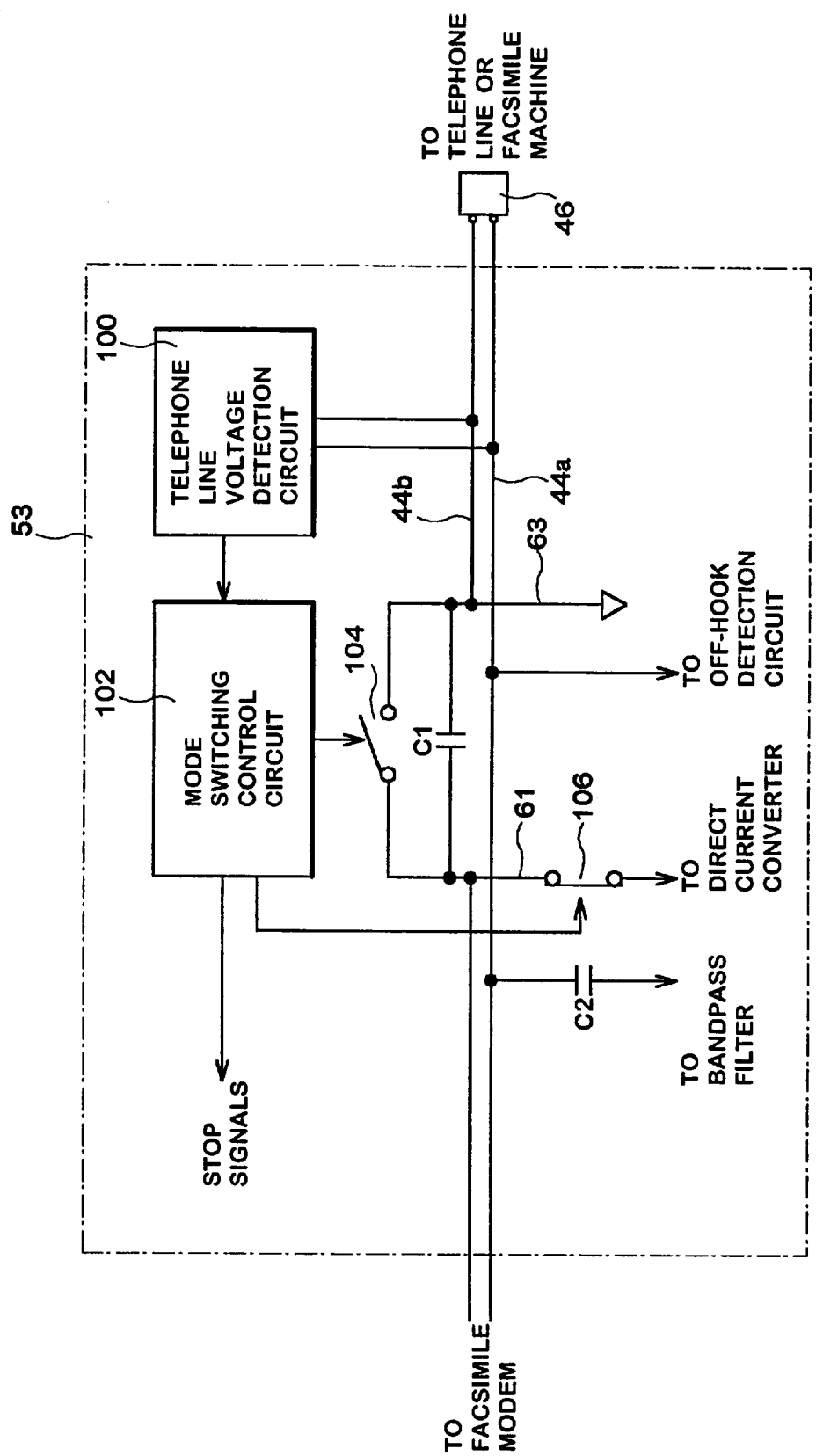
FIG. 13 is a block diagram of a communication control circuit 53 in yet another embodiment of the present invention.

FIG. 13 shows a communication control circuit 53 which has a mode switching function in addition to the communication control apparatus 50 shown in FIG. 3. In this embodiment, it is possible to perform data communication either using the telephone line or without using the telephone line by automatically judging whether the modular jack 46 is connected to either the telephone line or the facsimile machine 38.

Telephone line voltage (48V) is generated between the first line 44a and the second line 44b when the modular jack 46 is connected to the telephone line. Once the telephone line voltage is detected by a telephone line voltage detection circuit 100 acting as the telephone line voltage detection means, a result of detection is provided to a mode switching control circuit 102 acting as a mode switching control means. The capacitor C1 is short circuited by closing a switch 104 as switching means provided with both ends of the capacitor C1 under control of the mode switching control circuit 102 which receives the result of detection. In other words, the telephone line voltage is supplied to the card type FAX modem 36 because it is equivalent electrical condition that the capacitor C1 is not connected thereto. Hence, it is possible for the card type FAX modem 36 to perform data communication through the telephone line.

To avoid providing bad influences to data communication, stop signals which ban operation of the ringback signal transmission circuit 66, the bandpass filter 64 and the off-hook detection circuit 62 are outputted by the mode switching control circuit 102. Especially, the output of the ringback signal from the ringback signal transmission circuit 66 must be banned. In addition, the output of the direct current converter 60 is supplied so as not to provide bad influences to both the first line 44a and the second line 44b by opening a switch 106 provided with a line 61.

The telephone line voltage is not detected by the telephone line voltage detection circuit 100 when the modular jack 46 is connected with the facsimile machine 38. When the switch 104 is opened along with closing the switch 106 by the mode switching control circuit 102. All the ringback signal output circuit 66, the bandpass filter 64, the off-hook detection circuit 62 and the direct current converter 60 are operational. Thus, it is possible to perform data communication without using the telephone line.

Automatic switching of the communication mode shown in FIG. 13 can be applied to the communication control circuit 51 in FIG. 12.

Figure 14:
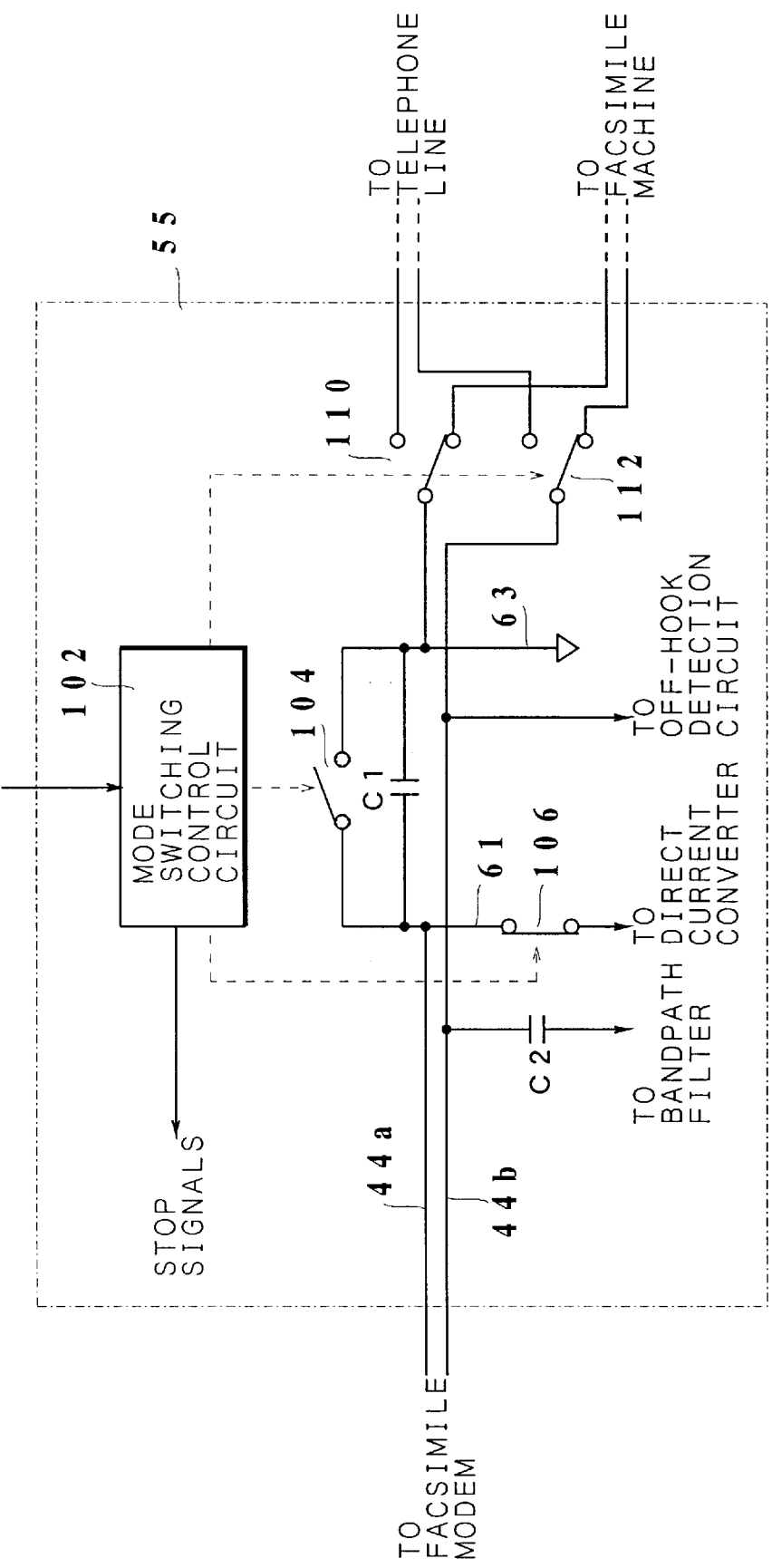
FIG. 14 is a block diagram of a communication control circuit 55 in still another embodiment of the present invention.

FIG. 14 is a block diagram of a communication control circuit 55 in still another embodiment of the present invention. In this embodiment, both the telephone line and the facsimile machine 38 are connected to the communication control circuit 55. Connection of these elements are switched by switching a switch 110 and a switch 112. Also, a mode switching control circuit 120 performs switching of the switches in the communication control circuit 55 on receipt of a command from the computer 32 to the FAX mode control circuit 52. The switches shown in FIG. 14 are switched for performing data communication without using the telephone line. In order to perform data communication using the telephone line, both the switch 110 and the switch 112 are switched toward the side of the telephone line, and the switch 104 is closed along with opening the switch 106.

Automatic switching of the communication mode shown in FIG. 14 can be applied to the communication control circuit 51 in FIG. 12.

In all of the embodiments described above, the capacitor C1 is used as the direct current interrupt means. Other electric elements such as a transformer etc. can be used instead of the direct current interrupt means. Also, in all the embodiments described above, the card type FAX modem 36 is used as an example of a modem, and other types of modem(s) such as an ordinal modem (non card type modem) can be used in the present invention.

Further, although one side of the data communication terminal comprises the card type FAX modem 36 and the other side of the data communication terminal consists of facsimile machine 38 in all the embodiments described above, the communication control apparatus in the present invention can be applied so long as both the one side of the data communication terminal and the other side of the data communication terminal comprise other types of modems. For instance, the present invention can be applied even when the data communication modem is used for both the one side of the data communication terminal and also the other side.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A communication control apparatus comprising:
    a first line, one end of which being connected to a first terminal for line connection of a modem and another end of which being connected to a first line connection terminal of a facsimile machine,
    a second line, one end of which being connected to a second terminal for line connection of the modem and another end of which being connected to a second line connection terminal of the facsimile machine,
    direct current interrupt means connected to the first line or the second line, and interrupting a direct current component while passing an alternating current component,
    voltage apply means for applying a telephone line emulation voltage to the first line or the second line positioned between the direct current interrupt means and the modem, and
    ground means for grounding the first line and the second line positioned between the direct current interrupt means and the facsimile machine.

2. A communication control apparatus in accordance with claim 1, further comprising:
    off-hook detection means for detecting an off-hook state of the modem by detecting the voltage of the first line or the second line,
    answering tone detection means for detecting whether an answering tone is being outputted or not by monitoring either of the first line or the second line, and
    ringback signal output means for outputting a ringback signal to the first line or the second line when no answering tone is detected by the answering tone detection means after a predetermined duration has passed from the detection of off-hook state by the off-hook detection means.

3. A communication control apparatus in accordance with claim 2, wherein one end of the voltage apply means is connected to a power source which outputs the telephone line emulation voltage, and the other end of the voltage apply means is a connection line for a power source connected to the first line or the second line.

4. A communication control apparatus in accordance with claim 3, wherein the power source is a power source for the beam.

5. A communication control apparatus in accordance with claim 2, wherein the voltage apply means is a direct current converter which is inputted at a voltage lower than the telephone line emulation voltage and applies the telephone line emulation voltage to the first line or the second line.

6. A communication control apparatus in accordance with claim 5, wherein a voltage sufficient to detect the off-hook state is applied to the first line or the second line by the power source until the off-hook state is detected by the off-hook detection means, and the telephone line emulation voltage is applied to the first line or the second line from the direct current converter when the off-hook state is detected by the off-hook detection means.

7. A communication control apparatus in accordance with claim 6, wherein the power source is a power source for the modem.

8. A communication control apparatus in accordance with claim 2, further comprising:

switching means connected to both ends of the direct current interrupt means, telephone line voltage detection means for detecting whether the telephone line voltage exists or not between the other end side of the first line and the other end side of the second line, and mode switching control means for controlling the voltage apply means so as to stop applying the telephone line emulation voltage to the first line or the second line along with closing the switching means when the telephone line emulation voltage is detected by the telephone line voltage detection means.

9. A communication control apparatus in accordance with claim 8, further comprising:

off-hook detection means for detecting an off-hook state of the modem by detecting the voltage of the first line or the second line, answering tone detection means for detecting whether an answering tone is being outputted or not by monitoring either of the first line or the second line, ringback signal output means for outputting a ringback signal to the first line or the second line when no answering tone is detected by the answering tone detection means after a predetermined duration has passed from the detection of the off-hook state by the off-hook detection means, and wherein, the mode switching control means controls operation of the ringback signal output means at least so as to stop when the telephone line voltage is detected by the telephone line voltage detection means.

10. A communication control apparatus in accordance with claim 1, wherein one end of the voltage apply means is connected to a power source which outputs the telephone line emulation voltage, and the other end of the voltage apply means is a connection line for a power source connected to the first line or the second line.

11. A communication control apparatus in accordance with claim 10, wherein the power source is a power source for the modem.

12. A communication control apparatus in accordance with claim 1, further comprising:

switching means connected to both ends of the direct current interrupt means, telephone line voltage detection means for detecting whether the telephone line voltage exists or not between the other end side of the first line and the other end side of the second line, and mode switching control means for controlling the voltage apply means so as to stop applying the telephone line emulation voltage to the first line or the second line along with closing the switching means when the telephone line emulation voltage is detected by the telephone line voltage detection means.

13. A communication control apparatus comprising:

a first line, one end of which being connected to a first terminal for line connection of one side of a modem and another end of which being connected to a first line connection terminal of another side of the modem, a second line, one end of which being connected to a second terminal for line connection of a first side of the modem and another end of which being connected to a second line connection terminal of a second side of the modem, direct current interrupt means connected to the first line or the second line, and a direct current component being interrupted along with passing an alternating current component, voltage apply means for applying a telephone line emulation voltage to the first line or the second line positioned between the direct current interrupt means and the modem, ground means for grounding the first line and the second line positioned between the direct current interrupt means and the second side of the modem, off-hook detection means for detecting an off-hook state of the first side of the modem by detecting voltage of the first line or the second line, answering tone detection means for detecting whether an answering tone is outputted or not by monitoring either of the first line or the second line, and ringback signal output means for outputting a ringback signal to the first line or the second line when no answering tone is detected by the answering tone detection means after a predetermined duration has passed from the detection of the off-hook state by the off-hook detection means.

14. A method for controlling communication control apparatus, comprising the steps of:

connecting a terminal for line connection of a modem and a line connection terminal of the modem with a line, providing a direct current interrupt means which interrupts a direct current component while passing an alternating current component, applying a telephone line emulation voltage which emulates a power supply voltage of a telecommunications exchanger between the direct current interrupt means and the modem, and outputting a ringback signal to the line when no answering tone is detected after a predetermined duration from detection of an off-hook state has passed.

\* \* \* \* \*